(12) United States Patent
Garat et al.

(10) Patent No.: US 12,655,497 B2
(45) Date of Patent: Jun. 16, 2026

(54) LOW DENSITY HOT ROLLED STEEL, METHOD OF PRODUCTION THEREOF AND USE OF SUCH STEEL TO PRODUCE VEHICLE PARTS

(71) Applicant: ArcelorMittal, Luxembourg (LU)

(72) Inventors: Xavier Garat, Homécourt (FR); Pascal Lorenzini, Woippy (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 18/715,947

(22) PCT Filed: Dec. 10, 2021

(86) PCT No.: PCT/IB2021/061543
§ 371 (c)(1),
(2) Date: Jun. 3, 2024

(87) PCT Pub. No.: WO2023/105272
PCT Pub. Date: Jun. 15, 2023

(65) Prior Publication Data
US 2025/0019787 A1 Jan. 16, 2025

(51) Int. Cl.
| | |
|---|---|
| *B32B 15/01* | (2006.01) |
| *C21D 1/84* | (2006.01) |
| *C21D 6/00* | (2006.01) |
| *C21D 8/02* | (2006.01) |
| *C21D 8/0221* | (2026.01) |
| *C21D 8/0247* | (2026.01) |
| *C21D 9/46* | (2006.01) |
| *C22C 38/00* | (2006.01) |
| *C22C 38/04* | (2006.01) |
| *C22C 38/06* | (2006.01) |

(52) U.S. Cl.
CPC ............. *C21D 9/46* (2013.01); *B32B 15/012* (2013.01); *B32B 15/013* (2013.01); *C21D 1/84* (2013.01); *C21D 6/005* (2013.01); *C21D 8/02* (2013.01); *C21D 8/0226* (2013.01); *C21D 8/0263* (2013.01); *C22C 38/001* (2013.01); *C22C 38/002* (2013.01); *C22C 38/04* (2013.01); *C22C 38/06* (2013.01)

(58) Field of Classification Search
None
See application file for complete search history.

(56) References Cited

U.S. PATENT DOCUMENTS

| | | | | |
|---|---|---|---|---|
| 12,060,629 | B2 * | 8/2024 | Barges | .................... C22C 38/02 |
| 2003/0145911 | A1 | 8/2003 | Hoffmann et al. | |

| | | | | |
|---|---|---|---|---|
| 2006/0231177 | A1 | 10/2006 | Bano et al. | |
| 2009/0297387 | A1 | 12/2009 | Chin et al. | |
| 2015/0147221 | A1 | 5/2015 | Perlade et al. | |
| 2016/0194739 | A1 * | 7/2016 | Del Frate | ................ C22C 38/58 |
| | | | | 148/277 |
| 2019/0169720 | A1 | 6/2019 | Kim et al. | |
| 2021/0123121 | A1 | 4/2021 | Barges | |
| 2023/0029040 | A1 | 1/2023 | Lee et al. | |

FOREIGN PATENT DOCUMENTS

| | | |
|---|---|---|
| CN | 104928568 A | 9/2015 |
| CN | 108866435 A | 11/2018 |
| CN | 107119228 B | 8/2019 |
| JP | 2017106108 A | 6/2017 |
| JP | 2020509213 A | 3/2020 |
| WO | WO2021105489 A1 | 6/2021 |
| WO | WO2021125597 A1 | 6/2021 |
| WO | WO 2023105271 A1 | 6/2023 |
| WO | WO 2023105272 A1 | 6/2023 |

OTHER PUBLICATIONS

Park Seong-Jun et al., "Effect of Second Phase on the Deformation and Fracture Behavior of Multiphase Low-Density Steels", JOM: Journal of Metals, Springer New York LLC, United States, vol. 66, No. 9, doi:10.1007/S11837-014-1060-6, ISSN 1047-4838, (Aug. 1, 2014), pp. 1837-1844, (Aug. 1, 2014), XP035388552.
International Search Report PCT/IB2021/061542 dated Jul. 25, 2022.
International Search Report PCT/IB2021/061543 dated Jul. 25, 2022.
WO 2023105271 A1, Jun. 15, 2023, In English, filed as U.S. Appl. No. 18/715,947, filed Jun. 3, 2024.
WO 2023105272 A1, Jun. 15, 2023, In English, filed as U.S. Appl. No. 18/715,957, filed Jun. 3, 2024.

* cited by examiner

*Primary Examiner* — Daniel J. Schleis

(74) *Attorney, Agent, or Firm* — Davidson Kappel LLC

(57) ABSTRACT

A low density hot rolled steel including of 0.12%≤carbon≤0.25%, 3%≤manganese≤10%, 3.5%≤aluminum≤6.5%, 0%≤phosphorus≤0.1%, 0%≤sulfur≤0.03%, 0%≤nitrogen≤0.1%, 0%≤silicon≤2%, 0.01%≤niobium≤0.03%, 0.01%≤titanium≤0.2%, 0%≤molybdenum≤0.5%, 0%≤chromium≤0.6%, 0.01%≤copper≤2.0%, 0.01%≤nickel≤3.0%, 0%≤calcium≤0.005%, 0%≤boron≤0.01%, 0%≤Magnesium≤0.005%, 0%≤Zirconium≤0.005%, 0%≤Cerium≤0.1%, and the balance including iron and unavoidable impurities, the steel sheet having a microstructure including of ferrite from 60% to 80%, 10% to 35% kappa carbides (Fe,Mn)$_3$AlC$_x$, where x is lower than or equal to 1 and austenite from 0% to 10% wherein the microstructure grains having less than 4 GPa nano-hardness must be more than 45% and microstructure grains having nano-hardness of more than 5 GPa must be less than 10%.

31 Claims, No Drawings

LOW DENSITY HOT ROLLED STEEL, METHOD OF PRODUCTION THEREOF AND USE OF SUCH STEEL TO PRODUCE VEHICLE PARTS

The present invention deals with a low density steel. The steel according to the invention is particularly well suited for the manufacture of parts for vehicles such as land motor vehicles or for further processing to manufacture a cold rolled steel sheet and parts of the vehicles thereafter.

BACKGROUND

Environmental restrictions are forcing automakers to continuously reduce the $CO_2$ emissions of their vehicles. To do that, automakers have several options, whereby their principal options are to reduce the weight of the vehicles or to improve the efficiency of their engine systems. Advances are frequently achieved by a combination of the two approaches.

SUMMARY OF THE INVENTION

This invention relates to the first option, namely the reduction of the weight of the motor vehicles. In this very specific field, there is a two-track alternative:

The first track consists of reducing the thicknesses of the steels while increasing their levels of mechanical strength. Unfortunately, this solution has its limits on account of a prohibitive decrease in the rigidity of certain automotive parts and the appearance of acoustical problems that create uncomfortable conditions for the passenger, not to mention the unavoidable loss of ductility associated with the increase in mechanical strength.

The second track consists of reducing the density of the steels by alloying them with other lighter metals such as Aluminum. Among these kind of steels low-density steels have attractive mechanical and physical properties while making it possible to significantly reduce the weight for a hot rolled steel. In particular, US2003/0145911 which discloses a Fe—Al—Mn—Si light steel having good formability and high strength. However, the steel of US 2003/0145911 does not demonstrate hardness of the low density steel which is an important property for processing the steel hence the steel of US 2003/0145911 does not allow taking full advantage of their low density for parts of all kinds of geometry.

It is an object of the present invention to provide a steel sheet presenting a relative density below 7.3, a hardness of the steel less than 280 Hv and microstructure grains having less than 4 GPa nano-hardness must be more than 45% and microstructure grains having nano-hardness of more than 5 GPa must be less than 10%.

In a preferred embodiment, the steel sheet according to the invention presents a relative density below 7.2, a hardness of the steel less than 270 Hv and microstructure grains having less than 4 GPa nano-hardness more than 50% and microstructure grains having nano-hardness of more than 5 GPa be less than 8% and more preferably less than 5%.

The present invention provides a low density hot rolled steel comprising by weight:

0.12%≤carbon≤0.25%,
3%≤manganese≤10%,
3.5%≤aluminum≤6.5%,
0%≤phosphorus≤0.1%,
0%≤sulfur≤0.03%,
0%≤nitrogen≤0.1%, and optionally one or more of the following elements 0%≤silicon≤2%,
0.01%≤niobium≤0.03%,
0.01%≤titanium≤0.2%,
0%≤molybdenum≤0.5%,
0%≤chromium≤0.6%,
0.01%≤copper≤2.0%,
0.01%≤nickel≤3.0%,
0%≤calcium≤0.005%,
0%≤boron≤0.01%,
0%≤Magnesium≤0.005%,
0%≤Zirconium≤0.005%,
0%≤Cerium≤0.1%, and the balance including iron and unavoidable impurities, the steel sheet having a microstructure comprising, in area fraction, ferrite from 60% to 80%, 10% to 35% kappa carbides $(Fe,Mn)_3AlC_x$, where x is lower than or equal to 1 and austenite from 0% to 10% wherein the microstructure grains having less than 4 GPa nano-hardness must be more than 45% and microstructure grains having nano-hardness of more than 5 GPa must be less than 10%.

Other characteristics and advantages of the invention will become apparent from the following detailed description of the invention.

DETAILED DESCRIPTION

Carbon content is from 0.12% to 0.25%, more preferably from 0.13% to 0.2% by weight. Carbon imparts the strength to the steel by forming Kappa Carbides. The carbon content is advantageously from 0.13% to 0.2% to obtain simultaneously high strength, stretch flangeability.

Manganese content is present from 3% to 10% by weight. Manganese is an important alloying element in this system, mainly due to the fact Manganese, along with Carbon, controls the formation of carbides at grain boundaries at high temperature and thereby controls the hot shortness. If the Manganese is present above 10% it may lead to central segregation which is detrimental for the ductility of the steel of the present invention. Manganese when present below 3% doesn't allow formation of enough kappa carbides $(FeMn)_3AlC$. Preferred limit for the presence of Manganese is from 4% to 9% and more preferably from 4% to 8%.

Aluminum content is present from 3.5% to 6.5% by weight. Aluminum addition to the steel of the present invention effectively decreases its density. Aluminum is an alphagenous element and therefore ten s to promote the formation of ferrite and in particular of delta ferrite. The aluminum has a relative density of 2.7 and has an influence on the mechanical properties. As the aluminum content increases, the mechanical strength and the elastic limit also increase although the uniform elongation decreases, due to the decrease in the mobility of dislocations. Below 3.5%, the density reduction due to the presence of aluminum becomes less beneficial. Above 6.5%, the presence of ferrite increases beyond the expected limit and affects the present invention negatively. Moreover, the presence of Al above 6.5% may forms intermetallics such as Fe-Al, Fe₅-Al and other (Fe, Mn)Al intermetallics which will impart brittleness to the product that can cause cracking of the steel during hot rolling and may also be detrimental for the toughness of the steel. Preferably, the aluminum content will be limited to strictly less than 6.5% to prevent the formation of brittle intermetallic precipitation, hence the preferred limit is from 4% to 6% and more preferably from 5% to 6%.

Sulfur and phosphorus are impurities that embrittle the grain boundaries. Their respective contents must not exceed 0.03% and 0.1% by weight so as to maintain sufficient hot ductility.

Nitrogen content must be 0.1% or less by weight so as to prevent the precipitation of AlN and the formation of volume defects (blisters) during solidification.

Silicon is an optional element that makes it possible to reduce the density of the steel, and effective in solid solution hardening. Nevertheless, its content is limited to 2% by weight because above that level this element has a tendency to form strongly adhesive oxides that generate surface defects. The presence of surface oxides impairs the wettability of the steel and may produces defects during a potential hot-dip galvanizing operation. Therefore, the Si content will preferably be limited below 1.5%.

Niobium may be added as an optional element in an amount of 0.01% to 0.03% by weight to the steel of the present invention to provide grain refinement. The grain refinement allows obtaining a good balance between strength and elongation. But, niobium had a tendency to retard the recrystallization during hot rolling and annealing hence the limit is kept till 0.03%.

Titanium may be added as an optional element in an amount of 0.01% to 0.2% by weight to the steel of the present invention for grain refinement, in a similar manner as niobium.

Copper may be added as an optional element in an amount of 0.01% to 2.0% by weight to increase the strength of the steel and to improve its corrosion resistance. A minimum of 0.01% is required to get such effects. However, when its content is above 2.0%, it can degrade the surface aspect.

Nickel may be added as an optional element in an amount of 0.01 to 3.0% by weight to increase the strength of the steel and to improve its toughness. A minimum of 0.01% is required to get such effects. However, when its content is above 3.0%, nickel causes ductility deterioration.

Molybdenum can be added as an optional element that is present from 0% to 0.5% by weight in the steel of the present invention; Molybdenum plays an effective role in improving hardenability and hardness, when added in an amount of at least 0.01%. Mo is also beneficial for the toughness of the hot rolled product resulting to an easier manufacturing. However, the addition of Molybdenum excessively increases the cost of the addition of alloy elements, so that for economic reasons its content is limited to 0.5%. The preferable limit for Molybdenum is from 0% to 0.4% and more preferably from 0% to 0.3%.

Chromium can be added as an optional element of the steel of the present invention, is from 0% to 0.6% by weight. Chromium provides strength and hardening to the steel, but when used above 0.6% impairs surface finish of the steel. The preferred limit for chromium is from 0.01% to 0.5% and more preferably from 0.01% to 0.2%.

Other elements such as calcium, cerium, boron, magnesium or zirconium can be added individually or in combination in the following proportions by weight: Ce≤0.1%, B≤0.01, Ca≤0.005, Mg≤0.005 and Zr≤0.005. Up to the maximum content levels indicated, these elements make it possible to refine the ferrite grain during solidification.

Additionally some trace elements such as Sb, Sn can come from processing of the steel. The maximum limit up to which these elements are acceptable and are not detrimental for the steel of the present invention is 0.05% by weight cumulatively or alone, It is preferred by the steel of the present invention to have the content of these elements as low as possible and preferably less than 0.03%.

The microstructure of the steel sheet according to the invention comprises, in area fractions, ferrite from 60% to 80%, 10% to 35% tappa carbides and austenite from 0% to 10%.

The ferrite matrix is present as a primary phase of the steel of the present invention and is present from 60% to 80% by area fraction in the steel of the present invention and preferably from 65% to 80% by area fraction and more preferably from 65% to 78%. Ferrite is formed during the solidification of the slab from liquid iron and cooling after hot rolling and the ferrite of the present invention preferably forms as a banded structure having an average band thickness from 2 microns to 55 microns and more preferably from 2 microns to 50 microns and it is more preferably from 2 microns to 48 microns. The presence of the ferrite matrix in the present invention imparts the steel with strength. But the presence of ferrite content in present invention above 80% may have negative impacts due to the fact that, with the rise in temperature, solubility of carbon increases in ferrite. However, carbon in solid solution is highly embrittling for low-density steels because it reduces the mobility of dislocations, which is already low on account of the presence of aluminum. Hence a balance between ferrite content and kappa carbides, is very important to impart the present invention with requisite mechanical properties.

Kappa precipitate is a mandatory microconstituent for the steel of present invention and is present from 10% to 35% by area fraction. Kappa carbides in the invention is defined by carbides whose stoichiometry is $(Fe,Mn)_3AlC_x$, where x is lower or equal to 1. The area fraction of Kappa carbides can g up to 35% and the Kappa carbides of the present invention preferably have lamellar structure having an average lamellar thickness from 0.01 micron to 0.2 micron and more preferably from 0.02 micron to 0.18 micron and these lamellas of kappa carbides of the present invention preferably have lamellar distance from 0.02 micron to 0.45 micron and more preferably from 0.02 micron to 0.40 micron. Above 35%, the hardness of the steel of the present invention is very high which decreases the ductility and elongation. Below 10%, the targeted mechanical properties are not achieved. Preferentially, the area fraction of Kappa carbides should be from 12% to 35% and more preferably form 15% to 30%.

Austenite is an optional microconstituent for the steel of the present invention and is present from 0 to 10% wherein the Austenite of the present invention preferably has an average grain size from 2 microns to 12 microns and more preferably from 2 microns to 10 microns. Austenite is known to have a higher solubility of carbon than ferrite and acts as effective Carbon trap. Austenite present at a level above 10% produces a negative impact on the present invention by impairing the formation of Kappa carbides as well as ferrite thereby impairing the sought properties of the steel of the present invention. Hence the preferable limit for the presence of austenite is from 0% to 8% and more preferably from 0% to 5%.

In addition to the above microstructural constituent the microstructure of the present invention has 45% or more grains of microstructure of the present steel having a nano-hardness of less than 4 GPa, this feature of the steel of the present invention facilitates further processing of the hot rolled steel for diverse manufacturing process such as cold rolling, extrusion, pressing, stamping, hydroforming, hemming, punching and drawing. By keeping the nano hardness of 45% or more grains of the microstructure below 4 GPa, t e steel of present invention ensures the hot rolled steel is not very hard for the manufacturing process and simultaneously the steel must not be too soft for the mechanical properties. The preferable limit for the grains to have nano-hardness of less than 4 GPa is more than 50% and more preferably 55%.

Further, the hot rolled steel of the present invention also limits the presence of the grains of microstructure of the present steel have nano-hardness of more than 5 GPa to 10% or less. This is done because whenever the grains having nano-harness of 5 GPa are present at more than 10%, it imparts too much of wear on the industrial machinery used in manufacturing of the parts for automotive industry such as it is not possible to perform cold rolling without any prior thermal treatment when the steel contains 10% or more grains of microstructure having nano-hardness 5 GPa or more. Hence it is preferred to have grains having nano-hardness 5 GPa or more less than 5% and more preferably less than 3%.

In addition to the above-mentioned microstructure, the microstructure of the hot rolled low density steel is free from microconstituent components such as Martensite and bainite.

The steel sheet according to the invention can be produced by any appropriate manufacturing method and the person skilled in the art can define one. It is however preferred to use the method according to the invention, which comprises the following steps:

The steel sheets according to the present invention are preferably produced through a method in which a semi product, such as slabs, thin slabs, or strip made of a steel according to the present invention having the co position described above, is cast, the cast input stock first to cooled to room temperature and then reheated to a temperature above 1000° C., preferably above 1150° C. and more preferably above 1200° C. or the casted semi-finished product can be used directly at such a temperature without intermediate cooling. The semi-finished product for the present process is considered as a slab.

The reheated slabs are then undergoing hot rolling. The hot-rolling finishing temperature must be at least 750° C. and preferably at least 770° C. The hot-rolling finishing is kept above 750° C. to ensure that hot rolling must be completed in a region having delta ferrite from 50% to 100%.

The hot rolled strip obtained in this manner is then cooled, such cooling starting immediately after the finishing of hot rolling and the hot rolled strip being cooled from finishing of hot rolling to a coiling temperature range from 620° C. to 740° C. at a cooling rate CR1 from 1° C./s to 150° C./s. In a preferred embodiment, the cooling rate CR1 is from 4° C./s to 120° C./s and the preferred coiling temperature range from 630° C. to 730° C. During this cooling the steel of the present invention starts transformation from Delta ferrite into Kappa carbides, Ferrite and possibly Austenite.

Thereafter, the hot rolled steel must be coiled at a temperature from 620° C. to 740° C. and preferably the coiling is performed from 630° C. to 730° C. and more preferably the coiling is performed from 640° C. to 720° C.

The hot rolled steel is cooled from coiling temperature to room temperature at a cooling rate CR2 from 1° C./h to 50° C./h. In a preferred embodiment, the cooling rate CR2 is from 10° C./h to 40° C./h to obtain a low density hot rolled steel.

Thereafter an optional pickling or any other scale removal process may be performed to facilitate further processing for the hot rolled steel to be manufacturing into the part of the vehicle such as cold rolling, cutting into sheet pile, forming, extrusion, pressing, stamping, hydroforming, hemming, punching and drawing etc.

After cooling to room temperature, the hot rolled steel may optionally be submitted to a metallic coating operation to improve its protection against corrosion. The coating process used can be any process adapted to the steel of the invention. Electrolytic or physical vapor deposition can be cited, with a particular emphasis on Jet Vapor Deposition. The metallic coating can be based on zinc or on aluminium, for example.

Preferably, the aluminum-based coating comprises less than 15% Si, less than 5.0% Fe, optionally 0.1% to 8.0% Mg and optionally 0.1% to 30.0% Zn, the remainder being Al.

Advantageously, the zinc-based coating comprises 0.01-8.0% Al, optionally 0.2-8.0% Mg, the remainder being Zn.

EXAMPLES

The following tests, examples, figurative exemplification and tables which are presented herein are non-restricting in nature and must be considered for purposes of illustration only, and will display the advantageous features of the present invention.

Steel sheets made of steels with different compositions are gathered in Table 1, where the steel sheets are produced according to process parameters as stipulated in Table 2, respectively. Thereafter Table 3 gathers the microstructures of the steel sheets obtained during the trials and table 4 gathers the result of evaluations of obtained properties.

TABLE 1

| | Compositions Table one shows | | | | | | |
|---|---|---|---|---|---|---|---|
| Trials | C | Mn | Al | P | S | N | Si |
| 1 | 0.20 | 6.7 | 6.0 | 0.003 | 0.0025 | 0.001 | 0 |
| 2 | 0.15 | 4.1 | 5.6 | 0.001 | 0.0012 | 0.0010 | 0 |
| 3 | 0.30 | 6.7 | 5.8 | 0.001 | 0.0012 | 0.0010 | 0 | underlined values: not according to the invention.

TABLE 2

| | | Process parameters The inventive steels and the reference steels are reheated at 1200° C. | | | |
|---|---|---|---|---|---|
| Trials | Steels | hot rolling finish temperature (° C.) | CR1 (° C./s) | coiling temperature (° C.) | CR2 (° C./h) |
| I1 | 1 | 750 | 9 | 700 | 30 |
| I2 | 2 | 768 | 8.3 | 700 | 30 |
| R1 | 3 | 730 | 6.5 | 700 | 30 | underlines values: not according to the invention.

The resulting samples were then analyzed and the corresponding microstructure elements and mechanical properties were respectively gathered in table 3 and 4.

Table 3 gathers the results of test conducted in accordance of standards on XRD and different microscopes such as Optical Microscope, Scanning Electron Microscope for determining microstructural composition of both the inventive steel and reference trials. The fraction of austenite was measured by XRD. The area fractions of kappa carbides and martensite were determined by Optical and Scanning Electron Microscopy through the analysis of at least four images.

The area fraction of Ferrite was calculated by subtracting to 100% the sum of the fractions of all the other phases.

TABLE 3

| Trials | Ferrite (%) | Kappa carbides (%) | Austenite (%) | Martensite (%) |
|---|---|---|---|---|
| I1 | 68 | 29 | 3 | 0 |
| I2 | 79 | 21 | 0 | 0 |
| R1 | 38 | 13 | 15 | 34 |

I = according to the invention; R = reference; underlined values: not according to the invention.

It can be seen from the table above that the trials according to the invention all meet the microstructure targets.

Table 4 gathers the mechanical and surface properties of both the inventive steel and reference steel.

mechanical properties of the trials

The hardness is measured by Vickers hardness test conducted as per the ISO6507 standards. To determin the relative density of the steel, the volume of a steel sample is measured by Gas Displacement Pycnometry using helium on one side and its corresponding mass is measured on another side. The mass per volume ratio of the steel in g/cm$^3$ can then by calculated and further divided by the mass per volume ratio of water at 4° C. which amounts to 1 g/cm$^3$. The resulting value, which is wihtout a unit, is the relative density of the steel. To determine the nano-indentation, the samples are prepared by OPU polishing (8 min, dilution to 50%) before performing nanoindentation test, at a load of 3 mN. A spacing of 8 μm is chosen between the points of the indentation grid.

| Trials | Hardness (Hv) | Percentage of microstructure with Nano hardness less than 4 GPa | Percentage of microstructure with Nano hardness more than 5 GPa | Relative density |
|---|---|---|---|---|
| I1 | 232 | 79.1% | 4% | 7.2 |
| I2 | 219 | 82.4% | 0% | 7.2 |
| R1 | 286 | 40.5% | 40% | 7.2 |

I = according to the invention; R = reference; underlined values: not according to the invention.

The examples show that the steel sheets according to the invention are the only one to show all the targeted properties thanks to their specific composition and microstructures.

What is claimed is:

1. A low density hot rolled steel sheet comprising by weight:
0.12%≤carbon≤0.25%,
3%≤manganese≤10%,
3.5%≤aluminum≤6.5%,
0%≤phosphorus≤0.1%,
0%≤sulfur≤0.03%,
0%≤nitrogen≤0.1%,
and optionally one or more of the following elements
0%≤silicon≤2%,
0.01%≤niobium≤0.03%,
0.01%≤titanium≤0.2%,
0%≤molybdenum≤0.5%,
0%≤chromium≤0.6%,
0.01%≤copper≤2.0%,
0.01%≤nickel≤3.0%,
0%≤calcium≤0.005%,
0%≤boron≤0.01%,
0%≤magnesium≤0.005%,
0%≤zirconium≤0.005%,
0%≤cerium≤0.1%,
a balance including iron and unavoidable impurities;

the steel sheet having a microstructure comprising, in area fraction, ferrite from 60% to 80%, 10% to 35% kappa carbides (Fe,Mn)$_3$AlC$_x$, where x is lower than or equal to 1 and austenite from 0% to 10%, more than 45% of grains of the microstructure having a nano-hardness less than 4 GPa and less than 10% of the grains of the microstructure grains having a nano-hardness of more than 5 GPa.

2. The low density hot rolled steel sheet as recited in claim 1 wherein the carbon content is from 0.13% to 0.2%.

3. The low density hot rolled steel sheet as recited in claim 1 wherein the manganese content is from 4% to 9%.

4. The low density hot rolled steel sheet as recited in claim 1 wherein the austenite content is from 0% to 8%.

5. The low density hot rolled steel sheet as recited in claim 1 wherein the kappa carbides content is from 12% to 35%.

6. The low density hot rolled steel sheet as recited in claim 1 wherein the ferrite content is from 65% to 80%.

7. The low density hot rolled steel sheet as recited in claim 1 wherein the steel sheet is covered by a metallic coating.

8. The low density hot rolled steel sheet as recited in claim 1 wherein the ferrite is banded ferrite.

9. The low density hot rolled steel sheet as recited in claim 1 wherein the low density hot rolled steel sheet has a relative density below 7.3.

10. The low density hot rolled steel sheet as recited in claim 9 wherein the low density hot rolled steel sheet has a hardness less than 280 Hv.

11. The low density hot rolled steel sheet as recited in claim 8 wherein the banded ferrite has an average band thickness from 2 microns to 55 microns.

12. The low density hot rolled steel sheet as recited in claim 1 wherein the microstructure is free from martensite and bainite.

13. The low density hot rolled steel sheet as recited in claim 1 wherein the silicon content is 0%.

14. The low density hot rolled steel sheet as recited in claim 1 wherein the aluminum content is from 5.6% to 6.5%.

15. The low density hot rolled steel sheet as recited in claim 1 wherein the kappa carbides have lamellar structure.

16. A method for producing a low density hot rolled steel comprising the following steps:
feeding a slab having a composition of:
0.12%≤carbon≤0.25%,
3%≤manganese≤10%,
3.5%≤aluminum≤6.5%,
0%≤phosphorus≤0.1%,
0%≤sulfur≤0.03%,
0% nitrogen 0.1%,
and optionally one or more of the following elements
0%≤silicon≤2%,
0.01%≤niobium≤0.03%,
0.01%≤titanium≤0.2%,
0%≤molybdenum≤0.5%,
0%≤chromium≤0.6%,
0.01%≤copper≤2.0%,
0.01%≤nickel≤3.0%,
0%≤calcium≤0.005%,
0%≤boron≤0.01%,
0%≤magnesium≤0.005%,
0%≤zirconium≤0.005%,
0%≤cerium≤0.10%,
a balance including iron and unavoidable impurities;
reheating the slab at a temperature above 1000° C. and hot rolling the slab with a final rolling temperature of at least 750° C.;

cooling the hot rolled steel from finishing of hot rolling to a coiling temperature range from 620° C. to 740° C. at a cooling rate CR1 from 1° C./s to 150° C./s;

thereafter, coiling the hot rolled steel at a temperature from 620° C. to 740° C.;

then cooling the hot rolled steel from the coiling temperature to room temperature at a cooling rate CR2 from 1° C./h to 50° C./h to obtain a low density hot rolled steel, the low density hot rolled steel sheet having a microstructure comprising, in area fraction, ferrite from 60% to 80%, 10% to 35% kappa carbides $(Fe,Mn)_3AIC_x$, where x is lower than or equal to 1 and austenite from 0% to 10%, more than 45% of grains of the microstructure having a nano-hardness less than 4 GPa and less than 10% of the grains of the microstructure grains having a nano-hardness of more than 5 GPa.

17. The method as recited in claim 16 wherein the final rolling temperature is greater than or equal to 770° C.

18. The method as recited in claim 16 wherein the coiling temperature is from 630° C. to 730° C.

19. The method as recited in claim 16 wherein further comprising a final coating step.

20. A method for manufacturing a structural or safety or any other part of a vehicle comprising the method as recited in claim 16.

21. A method for manufacturing a structural or safety or any other part of a vehicle comprising utilizing the steel as recited in claim 1.

22. The method as recited in claim 16 wherein the ferrite is banded ferrite.

23. The method as recited in claim 16 wherein the low density hot rolled steel sheet has a relative density below 7.3.

24. The method as recited in claim 23 wherein the low density hot rolled steel sheet has a hardness less than 280 Hv.

25. The method as recited in claim 22 wherein the banded ferrite has an average band thickness from 2 microns to 55 microns.

26. The method as recited in claim 16 wherein the microstructure is free from martensite and bainite.

27. The method as recited in claim 16 wherein the silicon content is 0%.

28. The method as recited in claim 16 wherein the aluminum content is from 5.6% to 6.5%.

29. The method as recited in claim 16 wherein the hot rolling is completed in a region having delta ferrite from 50% to 100%.

30. The method as recited in claim 16 wherein the coiling temperature is from 700° C. to 740° C.

31. The method as recited in claim 16 wherein the kappa carbides have lamellar structure.

* * * * *